March 12, 1929. F. C. FERGUSON 1,705,086
BOLT
Filed Aug. 7, 1926
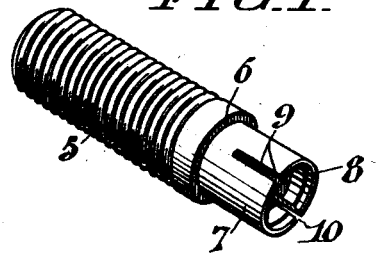
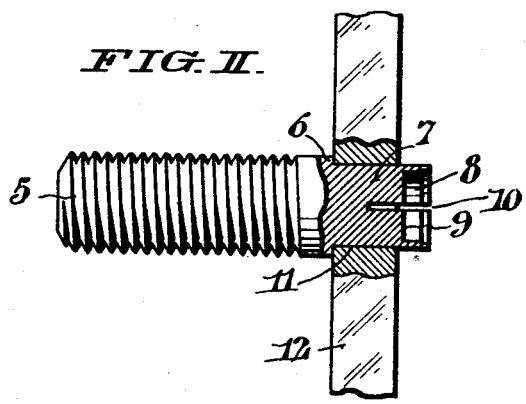
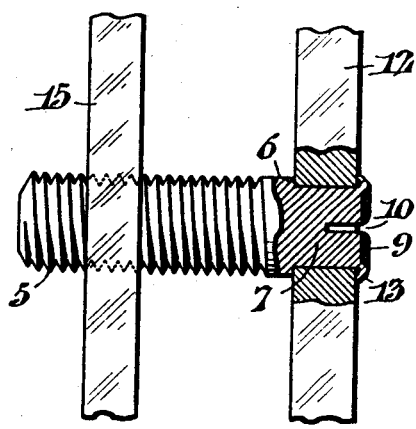
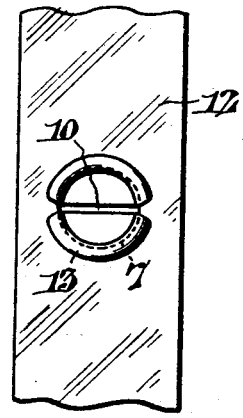
WITNESSES
John C. Bergner
Belford H. Neff
INVENTOR:
Frank C. Ferguson,
BY
ATTORNEYS.

Patented Mar. 12, 1929.

1,705,086

UNITED STATES PATENT OFFICE.

FRANK C. FERGUSON, OF PHILADELPHIA, PENNSYLVANIA, ASSIGNOR TO DAVID LUPTON'S SONS COMPANY, OF PHILADELPHIA, PENNSYLVANIA, A CORPORATION OF PENNSYLVANIA.

BOLT.

Application filed August 7, 1926. Serial No. 127,796.

This invention relates to bolts, more particularly to screw bolts of a type adapted to be secured, with capacity for free rotation, in a supporting element, and to take into an associated element for spacial adjustment thereof relative to the first mentioned element. Heretofore it has been customary to employ for this purpose, screw bolts with enlarged heads at one end, and separately attached collars, cotter pins, etc., to cooperate with the heads in holding the bolts against axial displacement in the supporting elements.

The object of my invention is to enable, through novel construction, permanent attachment of such bolts to the supporting elements without necessitating use of parts other than provided by the bolts themselves for the stated purpose.

How the above desideratum may be conveniently attained in practice will be apparent from the detailed description hereinafter of the typical embodiment of my invention shown in the drawings, whereof Fig. I is a perspective view of the bolt.

Fig. II is an illustration—partly in section and partly in elevation—showing the manner in which the bolt is intially applied to the supporting element.

Fig. III is a view similar to Fig. II showing the manner in which the bolt is permanently secured in the supporting element; and Fig. IV is an elevation of the assembly as viewed from the right of Fig. III.

From Fig. I it will be observed that my improved bolt is characterized by having a threaded shank 5 with an annular shoulder at 6, and an integral diametrically-reduced prolongation 7 beyond said shoulder. This prolongation 7 is partly tubular, that is to say, it is axially recessed as at 8 to a depth indicated by the numeral 9 in Fig. II. Furthermore, the prolongation 7 is transversely slotted to a point somewhat inward of the base 9 of the recess 8, as indicated at 10, for a purpose explained later.

In applying the bolt, the prolongation 7 is inserted, as shown in Fig. II, through the aperture 11 of an element 12 which is to support it, the shoulder 6 thus coming to rest against the inside of said element 12 with the axially-recessed portion 8 protruding beyond the opposite side. By use of a suitable tool, the hollow protrusion 8 is circumferentially swedged or expanded thereby forming a head 13 to perimetrically overlap the aperture 11 in the element 12, as clearly shown in Fig. III. In practice the depth of the recess 8 is made such as to accurately predetermine the plane of the head 13 and thereby prevent binding thereof against the part 12. By virtue of the transverse slot 10 in the head 13 formed as just described, a screw driver may be employed to rotate the bolt in effecting spacial adjustment of an associate element, such as shown at 15 in Fig. III, relative to the element 12. In this way it will be seen that I am able to secure the bolt permanently, but with capacity for free rotation, to the supporting element without necessitating use of collars or other adjunctive devices to insure it against axial displacement.

While I have herein shown and described my invention in connection with a screw bolt, the disclosed principle may obviously be embodied in analogous elements such as shafts or studs. Therefore, the term "bolts" as used in the appended claims is to be construed in a sense sufficiently broad to include such analogous elements.

Having thus described my invention, I claim:

1. An adjusting screw bolt comprising a threaded solid shank with an annular shoulder, and a plain integral axially-recessed transversely-slotted prolongation therebeyond for insertion through a bearing aperture in a supporting element, the axial recess of the prolongation being of such depth as to predetermine the plane of the bolt head and define a hollow protrusion beyond said element adapted to be subsequently expanded in forming a non-binding slotted head for cooperation with the shoulder aforesaid, said head thereby restraining the bolt against endwise displacement but with capacity to rotate freely in the bearing aperture of said supporting element, and the slot aforesaid serving to receive a tool whereby the bolt is rotated.

2. An adjusting bolt for spacially positioning two elements, said bolt having a solid portion screw-threaded to engage a tapped opening in one of the elements, and the other portion being shouldered and counter-bored thereby providing a diametrically reduced tubular extension for fitment into a bearing aperture in the other of said elements, and said tubular extension being diametrically slotted for flaring expansion into the form of a non-binding head operative in conjunction with the shoulder in restraining the bolt from endwise displacement without impairment to its free rotation.

3. As a new article of manufacture an adjustment device embodying a screw-threaded shank with a reduced plain portion, said plain portion being counter-bored to provide a tubular extension adapted to be bent over the opening of a member to be fastened with its inner end diametrically slotted for receiving a tool whereby the device may be rotated for the purposes specified.

In testimony whereof, I have hereunto signed my name at Philadelphia, Pennsylvania, this 4th day of August, 1926.

FRANK C. FERGUSON.